United States Patent
Rice et al.

(10) Patent No.: US 8,789,642 B1
(45) Date of Patent: Jul. 29, 2014

(54) SECURITY SYSTEM FOR VEHICLE

(76) Inventors: Arthur Rice, Vauxhall, NJ (US);
Michael Wakefield, Union, NJ (US)

( * ) Notice: Subject to any disclaimer, the term of this patent is extended or adjusted under 35 U.S.C. 154(b) by 47 days.

(21) Appl. No.: 11/544,538

(22) Filed: Oct. 10, 2006

(51) Int. Cl.
*B60R 25/00* (2006.01)

(52) U.S. Cl.
USPC ............................... 180/287; 70/207; 70/209

(58) Field of Classification Search
USPC ................... 180/287; 70/57.1, 207, 209, 210
See application file for complete search history.

(56) References Cited

U.S. PATENT DOCUMENTS

| 5,028,086 | A | * | 7/1991 | Smith | 296/69 |
| 5,251,465 | A | * | 10/1993 | Hwang | 70/209 |
| 5,277,043 | A | * | 1/1994 | Inashvili | 70/238 |
| 5,460,021 | A | * | 10/1995 | Taylor | 70/209 |
| 5,644,937 | A | * | 7/1997 | Farino | 70/261 |
| 5,737,949 | A | * | 4/1998 | Zenke | 70/209 |
| 5,829,283 | A | * | 11/1998 | Zenke | 70/209 |
| 5,964,109 | A | * | 10/1999 | Zenke | 70/209 |
| 6,382,694 | B1 | * | 5/2002 | Rankin et al. | 296/65.16 |
| 6,746,071 | B2 | * | 6/2004 | Farino | 296/65.16 |
| 6,901,780 | B1 | * | 6/2005 | Whinery | 70/209 |

* cited by examiner

*Primary Examiner* — Toan C To

(57) ABSTRACT

A security system with a steering wheel adjacent to a seat with a seat back which can swing forward to a predetermined position. The seat can also slide longitudinally between a rearward and forward position. The system includes a headrest mounted on the seat back to reiprocate between a retracted position and a locking position. With the seat back in the predetermined position and the seat in the forward position, the headrest is movable from said retracted position forward and down to the locking position to capture the steering wheel between the headrest and the seat back.

22 Claims, 4 Drawing Sheets

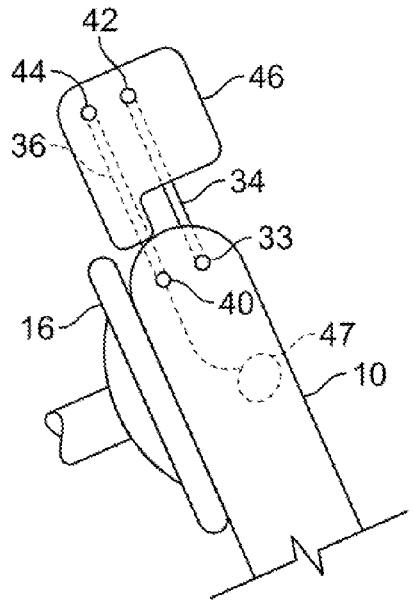
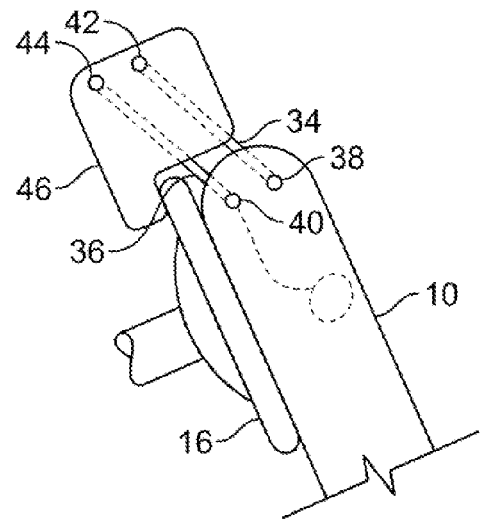
FIG. 5  FIG. 6
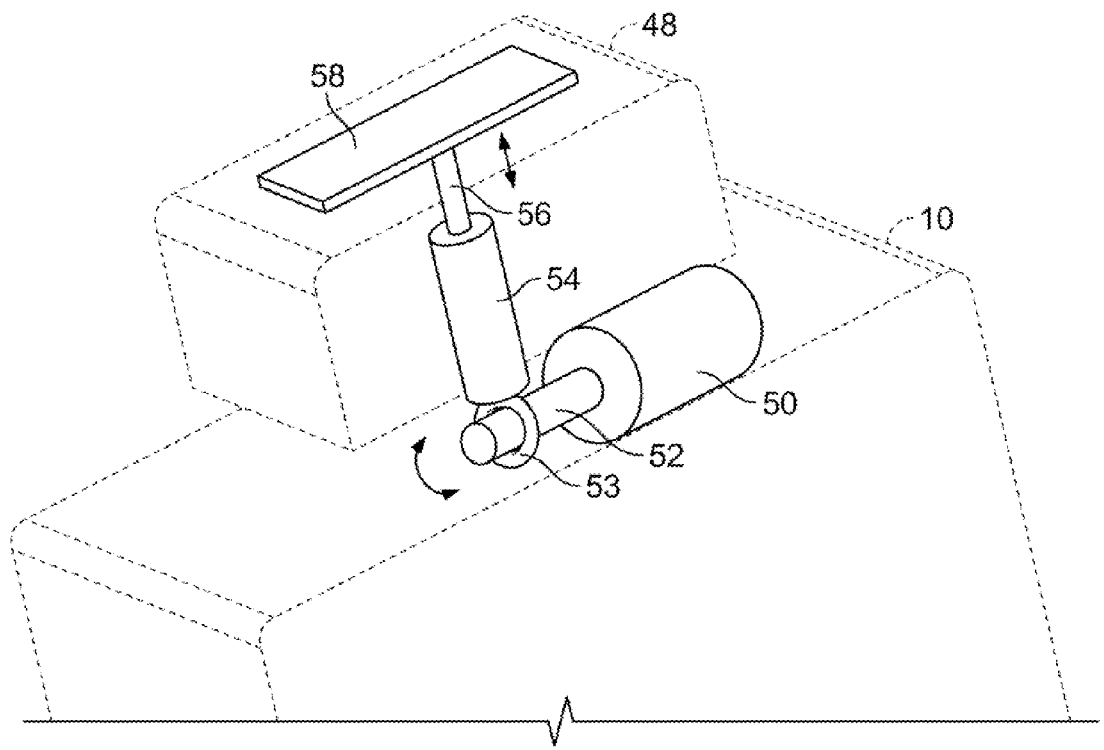
FIG. 7

SECURITY SYSTEM FOR VEHICLE

BACKGROUND OF THE INVENTION

1. Field of the Invention

The present invention relates to organizers for use in a motor vehicle, and in particular to organizers having a plurality of shelves.

2. Description of Related Art

It is estimated that in the United States, a car is stolen every 26 seconds. Auto theft is an increasing crime activity that affect every community. Thus, there is a need to reduce the theft of automobiles.

Different anti-theft devices are known in the art and have been implemented with various degrees of success. One commonly used anti-theft device is the Club® locking device. The Club® device has heat treated solid steel hooks that lock onto the steering wheel of a vehicle, rendering it undrivable when is properly employed. The Club® uses its high visibility to dissuade a potential thief from attempting to steal a protected vehicle and move to an easier target.

Other commonly used anti-theft systems include tracking devices. Commonly employing GPS or other satellite technology, these devices provide the owner of a vehicle and law-enforcement officials the ability to find a vehicle after it has been stolen. When an individual notices that his car has been stolen, the car can then be located and recovered. Also, the chance of catching the thief is increased. However, in many cases, car thieves are able to remove valuable parts of vehicles very quickly, and dispose of the remains before the vehicle can be located and recovered by law enforcement. In addition, if the tracking system can be disabled, the car cannot be located.

In addition, other immobilizing devices are also known in the art. These devices protect against the ability of a thief to hot wire a vehicle by detecting whether or not the vehicle has been started with its key, and preventing the driving of the vehicle when the key has not been used to start the vehicle. One method includes preventing the flow of fuel to the engine when the car has not been started with its rightful key, preventing the engine from running in such a case.

SUMMARY OF THE INVENTION

In accordance with the illustrative embodiments demonstrating features and advantages of the present invention, there is provided a security system for a vehicle with a steering wheel adjacent to a seat with a seat back that is articulated to swing forward to a predetermined position. This seat is longitudinally slidable between a rearward and forward position. The system also has a headrest mounted on the seat back to reciprocate between a retracted position and a locking position. With the seat back in the predetermined position and the seat in the forward position, the headrest is movable from the retracted position forward and down to the locking position to capture the steering wheel between the headrest and the seat back.

In one embodiment of the invention, one or more arcuate supports connect the headrest and the seat back. The supports are partially inside the seat back and can slide in and out of the seat back. At least a portion of the support which is inside the seat back has a rack with teeth. This rack meshes with a gear mounted inside the seat back. In a preferred embodiment of the invention, a motor controls the rotation of the gear, thus controlling the sliding movement of the supports.

In another embodiment of the invention, a number of parallel supporting bars connect the headrest to the se at back. One end of each of thebars is mounted in the head rest, and the other is mounted in the seat back. The bars are mounted on both ends such that they can pivot, keeping the angle of elevation between the seat back and the head rest substantially constant. As the bars rotate, they remain parallel to each other. In a preferred embodiment of the invention, a motor inside the seat back controls the rotation of the bars.

In another embodiment of the invention, an actuator connects the headrest to the seat back. The actuator is pivotally attached to the seat back on one end. The other end of the actuator is mounted inside the headrest. This enables adjustment of the angle of elevation between the seat back and the actuator. In a preferred embodiment of the invention, a motor mounted inside the seat back controls the adjustment of that angle of elevation.

In another embodiment of the invention, one or more supporting rods are connected between the headrest and the seat back. In this embodiment, the seat back has a pivot axle. The supporting rod or rods are mounted so that they can rotate about and slide transversely on the pivot axle. A cam follower is mounted on at least one of the rods to ride in a cam track in the seat back. In a preferred embodiment, an actuator is connected to a supporting rod, and controls the movement of the rod.

The movement of the seat back is manipulated by a seat back controlling device, which is connected between the seat back and the seat bottom. The device includes ratchet teeth attached to the seat bottom, and a dog attached to the seat back. The dog is rotatably mounted and is capable of engaging the ratchet teeth. When engaged, the dog prevents rotation of the seat back in one direction. The dog can also rotate to disengage the ratchet teeth, in which case the seat back can move in both directions. An actuator controls the rotation of the dog. In one embodiment, a gear is mounted to the seat back, and the rotation of the gear is controlled by a motor. The rotation of the gear rotates the seat back in relation to the seat.

The security system also includes a rack and pinion coupled between the vehicle and the seat enabling the seat to move longitudinally to a forward or rearward position. The pinion is powered. An actuator pin is included which when engaged, prevents longitudinal sliding of the seat.

BRIEF DESCRIPTION OF THE DRAWINGS

The above brief description as well as other objects, features and advantages of the present invention will be more fully appreciated by reference to the following detailed description of presently preferred but nonetheless illustrative embodiments in accordance with the present invention when taken in conjunction with the accompanying drawings, wherein:

FIG. 5 is a side elevational view of a security system that is an alternate to that of FIG. 1, and is shown with its headrest in a retracted position;

FIG. 6 is a side elevational view of the security system of FIG. 5 showing its headrest in the locking position;

FIG. 7 is a perspective view of a security system that is an alternate to those previously mentioned;

DETAILED DESCRIPTION OF THE PREFERRED EMBODIMENTS

Figure 1:
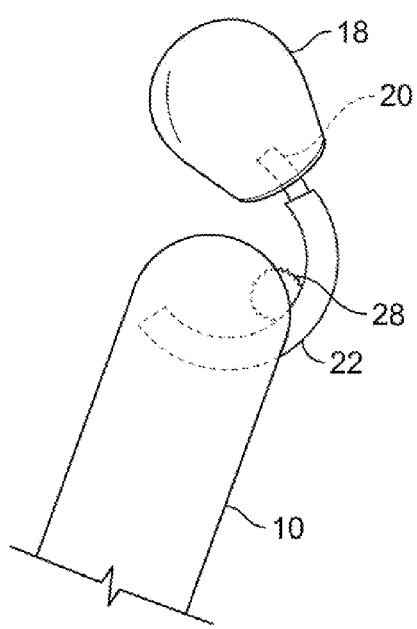
FIG. 1 is a side elevational view of the security system in accordance with principles of the present invention and showing its headrest in a retracted position.
Figure 2:
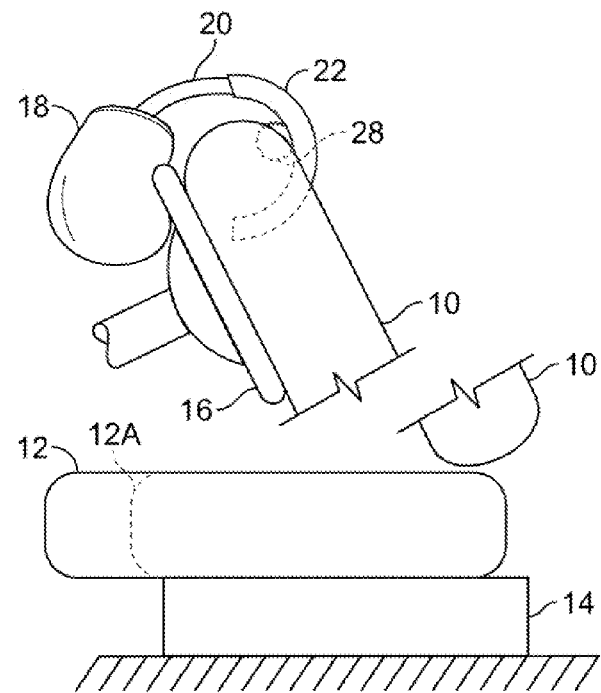
FIG. 2 is a side elevational view of the security system of FIG. 1 showing the headrest in the locking position.
Figure 3:
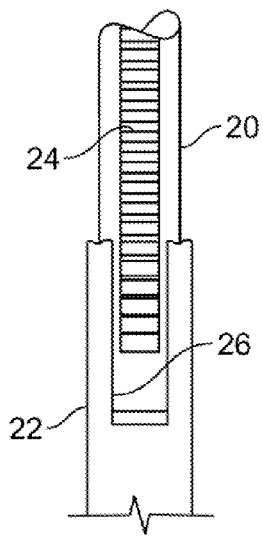
FIG. 3 is a view of the inside curve of the headrest support of FIG. 1.

Referring to FIGS. 1 and 2, the illustrated security system is shown cooperating with seat back 10 that articulates on seat 12. Seat 12 and seat back 10 may be a conventional passenger seat mounted in a motor vehicle. Power seats are contemplated for this embodiment, although in some instances non-power seats will be employed.

In this embodiment, seat 12 is mounted on base 14 to slide between the illustrated forward position and a rearward position 12A (shown in phantom) by virtue of a rack and pinion drive, shown further hereinafter. Seat back 10 is pivotally mounted on seat 12 and can be driven by a motor (shown hereinafter) to reciprocate backwards to the retracted position shown in FIG. 1 and forward to the predetermined position shown in FIG. 2 where the front of seat back 10 presses against a steering wheel 16.

A headrest 18 is mounted at the top of seat back 10 and has a generally cylindrical shape, although rectangular, ovoid, and other shapes are contemplated as well. Headrest 18 is supported by an arcuate supporting mechanism employing a pair of rods 20 that each curve through an arc of about 210°. The distal ends of rods 20 are affixed inside headrest 18. The proximal ends of rods 20 are slidably mounted in sleeves 22, which are mounted in seat back 10.

Referring to FIGS. 1-4, rod 20 has a substantially circular cross-section except for a row of teeth 24. (In FIG. 4, only sleeve 22 is shown in cross-section.) By virtue of teeth 24, rod 20 may be considered a rack. Sleeve 22 is a hollow tube extending through an arc of about 180°. Sleeve 22 has a slot 26 on its curved inside extending over most of its length, but without actually reaching its proximal and distal ends. Slot 26 is designed to expose teeth 24 so that gear 28 can engage teeth 24 and slide rod 20 through sleeve 22. In the retracted position of FIG. 1 about 180° of the rod 20 is sheathed in sleeve 22. In the locking position of FIG. 2 only about 30° of rod 20 remains in sleeve 22.

Figure 4:
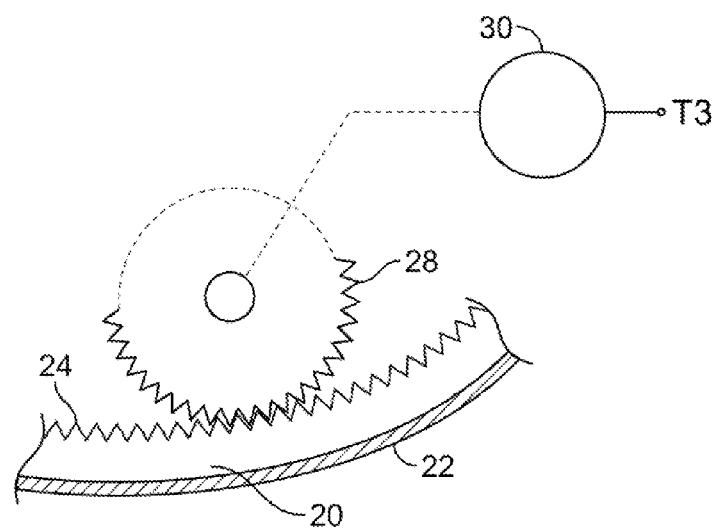
FIG. 4 is a cross-sectional view of the headrest support of FIG. 3 shown meshing with a gear.

As schematically illustrated in FIG. 4, gear 28 can be driven by a motor 30 acting as an actuator for the headrest supporting mechanism. Motor 32 is controlled by a signal on its terminal T3. Accordingly, motor 30 can move headrest 18 from the retracted position of FIG. 1 forward and down to the locking position of FIG. 2. In the locking position headrest 18 wraps around the top of steering wheel 16.

Referring to FIGS. 5 and 6, previously mentioned seat back 10 is shown pressing against steering wheel 16 as before. In this embodiment a pair of axles 38 and 40 are mounted near the top of seat back 10. The proximal ends of a pair of parallel supporting bars 34 and 36 are rotatably mounted on axles 38 and 40, respectively. Bars 34 and 36 are constrained by axles 38 and 40 to rotate in a common horizontal plane.

A pair of internal axles 42 and 44 are mounted near the top of headrest 46. The distal ends of bars 34 and 36 are journalled on axles 42 and 44, respectively, and are again constrained by these axles to rotate in a common horizontal plane. It will be understood that axles 38, 40, 42, and 44 extend almost the full width of the headrest 46 and rotatably support another pair of parallel bars (not shown).

Essentially bars 34 and 36 define a parallelogram with varying corner angles. Consequently, the plane containing axles 38 and 40 remains parallel to the plane containing axles 42 and 44. As a result, headrest 46 can swing forward and down while its front face remains parallel to the front face of seat back 10. Bars 34 and 36 can be rotated by an actuator, shown schematically herein as motor 47.

Headrest 46 will have rear-facing openings or slots (not shown) to accommodate the articulation of bars 34 and 36. The top of seat back 10 will also have openings or slots (not shown) to accommodate the articulation of rods 34 and 36. In the locking position shown in FIG. 6, headrest 46 grips the top of steering wheel 16.

Referring to FIG. 7, mounted above previously mentioned seat back 10 (shown in phantom) is another headrest 48 (also shown in phantom). A motor 15 with a rotary shaft 52 is mounted near the top of seat back 10. The knuckle 53 of a pneumatic actuator 54 is attached to rotary shaft 52. Consequently, motor 15 can rotate actuator 54 in a vertical plane to change its angle of elevation. Actuator 54 has a piston rod 56 attached to mounting plate 58. Headrest 48 is attached to plate 58.

Actuator 54 can be operated to extend rod 56 and lift headrest 48. Thereafter, motor 15 can swing headrest 48 forward and down. As before, headrest 48 can move into a locking position to grip the top of the previously mentioned steering wheel.

Figure 8:
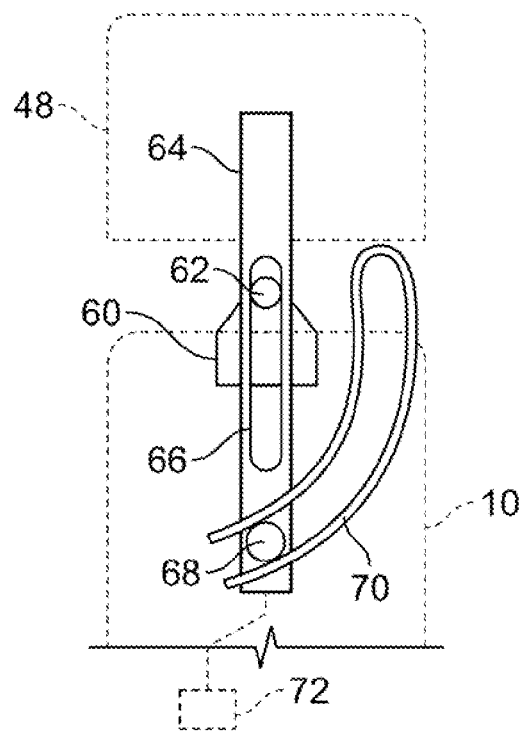
FIG. 8 is a side elevational view of a security system that is an alternate to those previously mentioned.
Figure 9:
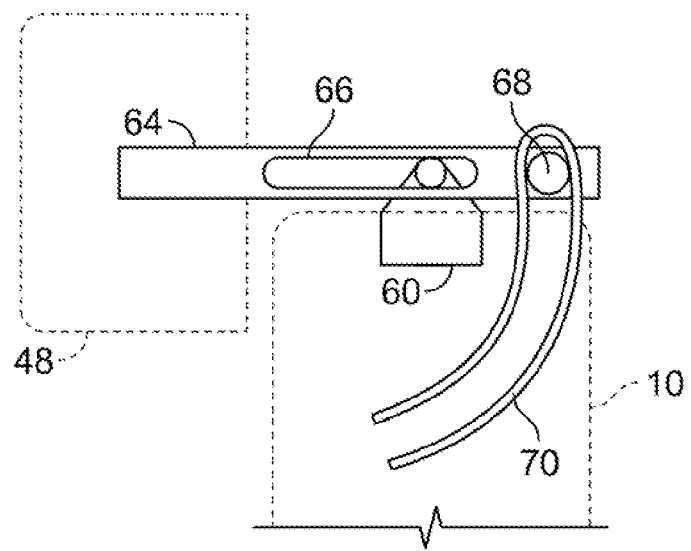
FIG. 9 is a side elevational view of the security system of FIG. 8 showing its headrest in the locking position.

Referring to FIGS. 8 and 9, previously mentioned seat back 10 and headrest 48 are shown in phantom. Mounted atop seat back 10 are identical right and left trunnion plates (left plate 60 visible in these Figures) for supporting axle 62, which defines a pivot axis. Right and left supporting rods (only left rod 64 visible in these Figures) are mounted on common axle 62. Rod 64 is shown as an elongated plate having a longitudinal slot 66. The axle 62 extends through slot 66 so that rod 64 can rotate and slide transversely on axle 62.

One end of the rod 64 is fixed to headrest 48. The other end of the rod 64 has a cam follower 68 in the form of a wheel rotatably mounted on the rod. An arcuate cam track 70 is mounted in seat back 10. Track 70 is shown as a pair of curved guide walls defining a path that follower 68 must travel. It will be appreciated that rod 64 cooperates with a complementary parallel rod (not shown) having its own cam follower and cam track.

If the cam follower 68 is driven upwardly along cam track 70 supporting rod 64 will rotate counterclockwise about the pivot axis of axle 62. At the same time, follower 68 will move closer to axle 62 and cause rod 64 to slide on axle 62. Consequently, headrest 48 will move away from axle 62 and will swing forward and down. As before, headrest 48 can grip the top of the previously mentioned steering wheel.

In FIG. 8 an actuator 72 is shown schematically connected to supporting rod for driving cam follower 68 up and down cam track 70. In one embodiment a pneumatic cylinder can be mounted inside seat back 10 with its piston rod connected to rod 64 near the cam follower 68. Consequently, when the piston rod extends, cam follower 68 is driven up the cam track 70.

Figure 10:
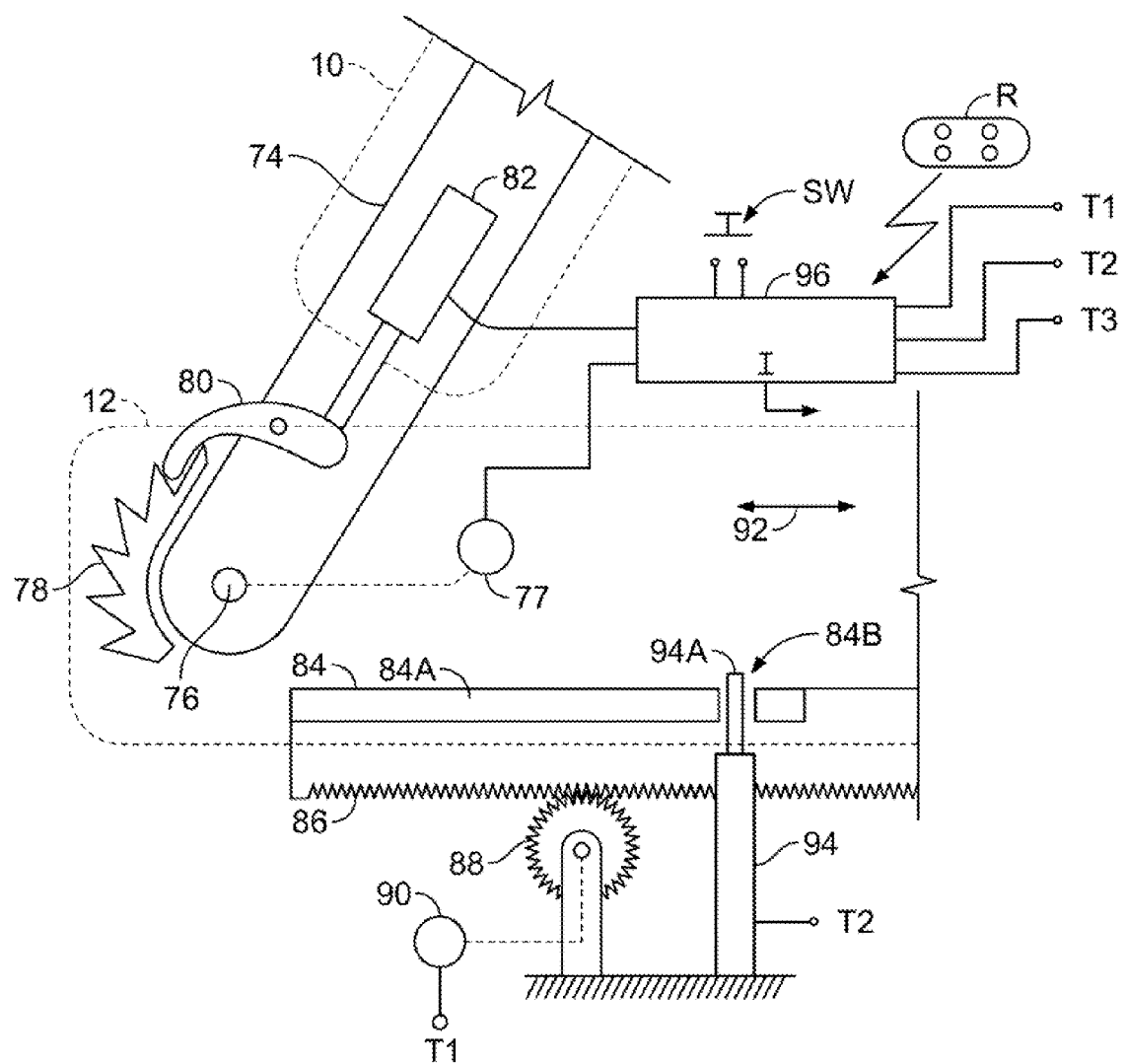
FIG. 10 is a side elevational view of a seat mechanism that cooperates with any of the foregoing embodiments.

Referring to FIG. 10, previously mentioned seat back 10 (shown in phantom) is shown pivotally mounted to previously mentioned seat 12 (also shown phantom). The seat back 10 is shown with conventional supporting struts 74 that are rotatably mounted on shaft 76 in seat 12. In some embodiment shaft 76 may be driven by an electric motor (schematically shown herein as drive motor 77) for the purpose of adjusting the angle of seat back 10; although embodiments are contemplated where the seat back angle is adjusted manually.

In this embodiment a set of ratchet teeth 78 are mounted in a fixed position in seat 12 concentrically around shaft 76 to act as a seat back controller. A dog 80 pivotally mounted on strut 74 has a torsion spring (not shown) that biases the distal tip of dog 80 against ratchet teeth 78. In the usual fashion, strut 74 can rotate clockwise as dog 80 slips over the ratchet teeth 78. Counterclockwise rotation is prevented by the ratchet teeth 78 in the usual fashion. A driver 82 in the form of a normally retracted solenoid can be actuated to swing dog 80 clockwise to disengage ratchet teeth 78. Therefore, strut 74 and seat back 10 can then swing counterclockwise so long as solenoid 82 remains actuated.

Seat 12 is rigidly attached to rail 84, which has an L-shaped cross-section. The bottom edge of rail 84 has a rack of teeth 86 engaging pinion 88, which is journalled at a fixed position relative to the vehicle frame. Pinion 88 is schematically shown driven by a drive motor 90 for the purpose of moving seat 12 in the rearward/forward directions 92. Motor 90 can be controlled by a signal on its terminal T1.

The upper flange 84A of rail 84 has an aperture 84B. A normally extended solenoid 94 is mounted in a fixed position relative to the vehicle frame and is shown with its drive 94A pin inserted through aperture 84B. Until solenoid 94 is actuated to retract its drive pin 94A, rail 84 and seat 12 are locked and cannot move in the directions 92. Solenoid 94 can be controlled by a signal on its terminal T2.

To facilitate an understanding of the principles associated with the foregoing apparatus, its operation will be briefly described in connection with the embodiment of FIGS. 1-4, and 10. When operating a motor vehicle, seat back 10 will be backwardly inclined as shown in FIG. 1 with headrest 18 in the illustrated retracted position. In vehicles having power seats, motor 77 (FIG. 10) can be operated to adjust the inclination of seat back 10. When the operator wishes to recline further back solenoid 82 will be operated simultaneously with motor 77. Specifically, solenoid 82 will rotate dog 80 to disengage ratchet teeth 78 and allow strut 74 and seat back 10 to recline further. For non-power seats solenoid 82 will exist and will be operated whenever the vehicle's ignition is on.

In vehicles having power seats, seat 12 can be moved forwards and backwards when motor 90 rotates pinion 88 to slide rail 84 in longitudinal directions 92. Whenever the power seat is operated, solenoid 94 will be energized to retract its actuator pin 94A to avoid insertion into locking aperture 84B. For non-power seats, solenoid 94 will exist and will be actuated whenever the vehicle's ignition is on, to avoid inserting locking pin 94A into aperture 84B.

To secure the motor vehicle an operator can press a button on remote control R (FIG. 10), which will send a lock-down signal to controller 96 by an RF link, infrared link, or other linking means. Remote control R may be a separate dedicated control or may be integrated with a conventional remote vehicle locking system, typically implemented as a key fob with push buttons. Alternatively, the operator can press a dashboard switch SW, shown connected to controller 96, which will be considered a lock-down signal if the vehicle's ignition is off. Controller 96 senses whether the vehicle's ignition is off through input I, which is connected to the vehicle's ignition. Controller 96 is also shown with outputs connected to motor 77 and solenoid 82 for controlling them.

Once a lock-down signal is received, controller 96 will transmit a control signal on terminal T1 to start motor 90 in order to rotate pinion 88 and move rail 84 and seat 12 toward steering wheel 16 (FIG. 2). It will be appreciated that in FIG. 10 seat 12 is already in a fully forward position. However, before ever reaching this position locking pin 94A of solenoid 94 would not be aligned with aperture 84B and would simply slide against the underside of flange 84A at a position in front of aperture 84B. Solenoid 94 will be unenergized at this time and so controller 96 produces no control signal on terminal T2.

As seat 12 and rail 84 move forward, eventually pin 94A will reach aperture 84B. Since pin 94A is biased to normally extend, the pin will snap into aperture 84B to fix rail 84 and seat 12 relative to the motor vehicle.

Contemporaneously, controller 96 will transmit a control signal to motor 77. Consequently, shaft 76 will rotate to swing strut 74 and seat back 10 forward. Dog 80 will slide over ratchet seat 78 in the usual fashion without impeding the rotation of the back 10. As a result, seat back 10 and seat 12 will now be in the position illustrated in FIG. 2, at which time motors 77 and 90 will stop. In some cases, when limit switches (not shown) may be employed to stop these motors. At this time, the front of seat back 10 will be pressed against steering will 16. Headrest 18, however, will still be in the retracted position shown in FIG. 1.

Controller 96 will now transmit a control signal on terminal T3 to start motor 30 (FIG. 4). In response gear 28 will rotate, thereby engaging teeth 24 and pushing rod 20 out of sleeve 22. As rod 20 extends from sleeve 22, headrest 18 will extend forward and down to the position shown in FIG. 2, after which motor 30 will stop. In this illustrated position, headrest 18 locks onto the steering wheel 16.

The motor vehicle is now undrivable for several reasons. Seat 12 and seat back 10 are forward to such an extent that there is no room for a driver. In fact, seat back 10 is pressed over steering wheel 16, making it unusable. A thief attempting to pull the seat back 10 off steering wheel 16 will be frustrated for several reasons. First, headrest 18 is locked over steering wheel 16 to prevent movement of seat back 10 away from the steering wheel. Also, dog 80 remains latched onto ratchet teeth 78 to resist rotation of seat back 10 about shaft 76.

A thief attempting to push back seat 12 that will also be frustrated. First, gear 88 does not freely rotate, being connected to dormant motor 90. The gear ratio between motor 90 and gear 88 is such as to make rotation of motor 90 impractical for a thief. In addition, pin 94A is locked in aperture 84B to prevent motion of rail 84 and seat 12.

To again drive the motor vehicle, an operator in possession of remote control R may press an appropriate button to release the security system. Alternatively, an operator can press pushbutton switch SW at a time when the vehicle's ignition switch is on. In response, controller 96 will send a control signal on terminal T3 to motor 30 (FIG. 4) to rotate the gear 28 clockwise in order to retract rod 20 and headrest 18 back to the position shown in FIG. 1.

Once elements 18 and 20 are retracted, motor 30 will stop. Thereafter, controller 96 will send a control signal to terminal T2 to energize solenoid 94 and retract pin 94A momentarily. Next, controller 96 will send a control signal on terminal T1 to start motor 90 to rotate gear 88 in a direction to move rail 84 and seat 12 backwardly. When seat 12 reaches its original position motor 90 will stop.

Controller 96 will at this time transmit a control signal to solenoid 82 to swing dog 80 clockwise so that ratchet teeth 78 will not interfere with adjustment of the angle of seat back 10. Solenoid 82 can remain energized whenever the vehicle is operating or can be energized whenever the angle of seat back 10 is being adjusted. Controller 96 will transmit a signal to start motor 77 to rotate shaft 76 to return seat back 10 to its original position illustrated in FIG. 1, after which motor 77 will stop.

The operation for the embodiment of FIGS. 5 and 6 would be the same except that motor 47 will take the place of previously mentioned motor 30. Accordingly, when seat back 10 presses against steering wheel 16, motor 47 can be energized to rotate bar 36, causing bar 34 to rotate as well, and bring headrest 46 forward and down to the position shown in FIG. 6. The steps will be reversed when one wishes to drive the motor vehicle again.

In a similar fashion, actuator 54 and motor 50 of FIG. 7 will take the place of previously mentioned motors 30 and 47. Again, once seat back 10 is pressed against the previously mentioned steering wheel, a controller (such as that shown in FIG. 10) can operate actuator 54 and lift headrest 48. Thereafter, motor 50 can swing headrest 48 down to lock around the steering wheel. Actuator 54 can then be retracted to squeeze the steering wheel against seat back 10. As before, the steps would be reversed when one wishes to drive the motor vehicle.

For the embodiment of FIGS. 8 and 9, motor 72 will be operated instead of the previously described motors in order to move headrest 48. In particular, once seat back 10 is pressed against the previously mentioned steering wheel, actuator 72 will be operated to drive cam follower 68 up track 70 to rotate supporting rod 64 from the position shown in FIG. 8. Since cam follower 64 will also move closer to axle 62, supporting rod 64 will slide along axle 62 toward one end of slot 66, eventually reaching the position shown in FIG. 9. Consequently, headrest 48 will swing forward and down around the previously mentioned steering wheel. Again, the steps would be reversed when one wishes to drive the vehicle.

In some cases the foregoing system will be used during a carjacking where the owner is left behind. The carjack victim would immediately call a central office or in some cases dial 911 or call a nearby police station. The victim would report the carjacking and request remote operation of the security system. In such embodiments controller 96 (FIG. 10) may have a radio link to a satellite or a nearby radio tower. When an emergency signal is received by controller 96 a sequence is initiated to disable the vehicle.

Using associated speakers (not shown) the system will order the thieves to pull over and exit the vehicle, (it will shut down music if being played). The system will also announce that the seat block has been activated and the thieves have 30 seconds to exit the vehicle. This will repeat 3 times, before the system disables the car (for example, by shutting off gasoline to the engine or by interrupting the ignition circuit). The vehicle speed will consequently stop and the system will then count down from 10 before announcing that "activation is now in progress; thank you."

At this time the seat 12 begins sliding forward towards the steering wheel 16 and begin the locking procedure. By this time the thief will have exited the vehicle. The security system will then proceed to go into locking mode causing the seat back 10 to swing forwards before locking the headrest 18 (FIG. 2) around the steering wheel.

It is appreciated that various modifications may be implemented with respect to the above described, preferred embodiment. In some embodiments the security system may be automatically operated after the vehicle doors are locked (e.g., 30 seconds after the doors are locked). Also, the security system may be released automatically whenever the vehicle's doors are unlocked. In some embodiments non-powered seats are employed, in which case the operator will manually slide the seat forward and swing the seat back against the steering wheel, before manually moving the headrest forward and down to grip the steering wheel. Such a manual system will still employ solenoids or other actuators to operate ratchets, locking pins or the like to keep the seat, seat back, and headrest in the locked positions. The actuators or motors for moving the seat, seat back and headrest may employ motors, linear actuators, pneumatic pistons, solenoids, etc. A similar variety of motors and actuators may be employed for operating the previously mentioned ratchets, locking pins or other devices for holding the seat, seat back, and headrest position. Instead of ratchets or locking pins the system may have alternate types of locking devices. The foregoing security system may be employed in a variety of motor vehicles, not just passenger automobiles. In addition, the system may have a communication system operating over, for example, a cellular telephone network so a forgetful owner can call to make sure the vehicle is locked, when not around the vehicle.

Obviously, many modifications and variations of the present invention are possible in light of the above teachings. It is therefore to be understood that within the scope of the appended claims, the invention may be practiced otherwise than as specifically described.

The invention claimed is:

1. A security system for a vehicle having a steering wheel adjacent to a seat with a seat back that is articulated to swing forward to a predetermined position, said seat being longitudinally slidable between a rearward and forward position, the system comprising:
   a headrest mounted on said seat back to reciprocate between a retracted position and a locking position; with said seat back in said predetermined position and said seat in said forward position, said headrest being movable from said retracted position forward and down to said locking position to capture said steering wheel between said headrest and said seat back.

2. The security system according to claim 1 comprising at least one arcuate supporting mechanism connected between said headrest and said seat back.

3. The security system according to claim 2 wherein said at least one arcuate supporting mechanism is partially inside said seat back and is slidably attached to said seat back.

4. The security system according to claim 3 wherein the portion of said at least one supporting mechanism inside said seat back comprising a rack.

5. The security system according to claim 4 comprising a gear rotatably mounted inside said seat back, said gear meshing with said rack to render said rack unable to slide without rotation of said gear.

6. The security system according to claim 5 comprising a motor coupled to said gear for controlling the rotation thereof.

7. The security system according to claim 1 comprising a plurality of parallel supporting bars, said plurality of parallel bars each having a distal end pivotally mounted at said headrest and a proximal end pivotally mounted at said seat back in order to give said headrest a substantially constant angle of elevation relative to said seat back.

8. The security system according to claim 7 comprising a motor for controlling the swinging of said plurality of parallel supporting bars.

9. The security system according to claim 1 comprising an actuator connected between said headrest and said seat back for reciprocating said headrest.

10. The security system according to claim 9 wherein said actuator is pivotally attached to said seat back in order for said actuator to extend at an adjustable angle of elevation.

11. The security system according to claim 10 comprising a motor mounted inside said seat back, said motor controlling the angle of elevation of said actuator.

12. The security system according to claim 1 comprising at least one supporting rod connected between said headrest and said seat back.

13. The security system according to claim 12 wherein said at least one supporting rod is mounted to said seat back to rotate about and slide transversely relative to a pivot axis at said seat back.

14. The security system according to claim 13 comprising an arcuate cam track mounted in said seat back.

15. The security system according to claim 14 wherein said at least one supporting rod further comprising a cam follower, said cam follower riding on said cam track in order to rotate and transversely slide said at least one supporting rod about the pivot axis.

16. The security system according to claim 15 comprising an actuator, said actuator being coupled to said at least one supporting rod to control movement of said at least one supporting rod.

17. The security system according to claim 1 comprising a seat back controller connected between said seat back and said seat.

18. The security system according to claim 17 wherein said seat back controller comprises a plurality of ratchet teeth mounted in said seat.

19. The security system according to claim 18 comprising a dog rotatably mounted in said seat back and capable of engaging said ratchet teeth in order to prevent rotation of said seat back in one direction.

20. The security system according to claim 19 comprising an driver connected to said dog for disengaging it from said ratchet teeth.

21. The security system according to claim 1 comprising a rack and pinion coupled between said vehicle and said seat, said pinion powered in order to move the seat.

22. The security system according to claim 21 comprising a locking pin for restricting the movement of said seat in relation to said vehicle.

* * * * *